United States Patent
Sang et al.

(10) Patent No.: US 12,355,568 B2
(45) Date of Patent: Jul. 8, 2025

(54) WIRELESS LOCAL AREA NETWORK TRANSMISSION METHOD AND DEVICE, AND TRANSCEIVER

(71) Applicant: Huawei Technologies Co., Ltd., Shenzhen (CN)

(72) Inventors: Ran Sang, Nanjing (CN); Yungui Wang, Nanjing (CN); Chenhe Ji, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 505 days.

(21) Appl. No.: 17/844,313

(22) Filed: Jun. 20, 2022

(65) Prior Publication Data

US 2022/0321265 A1    Oct. 6, 2022

Related U.S. Application Data (63) Continuation of application No. PCT/CN2020/115915, filed on Sep. 17, 2020.

(30) Foreign Application Priority Data

Dec. 20, 2019 (CN) .......................... 201911330663.9

(51) Int. Cl.
*H04W 4/00* (2018.01)
*H04L 1/1607* (2023.01)
*H04W 84/12* (2009.01)

(52) U.S. Cl.
CPC .......... *H04L 1/1621* (2013.01); *H04L 1/1614* (2013.01); *H04W 84/12* (2013.01)

(58) Field of Classification Search
CPC ....... H04L 1/1621; H04L 1/1614; H04L 1/16; H04W 84/12
(Continued)

(56) References Cited

U.S. PATENT DOCUMENTS

| 7,599,363 B2 * | 10/2009 | Jang ...................... H04L 1/1614 370/476 |
| 10,742,285 B1 * | 8/2020 | Chu ...................... H04B 7/0695 |

(Continued)

FOREIGN PATENT DOCUMENTS

| CN | 109314606 A | 2/2019 |
| CN | 110572244 A | 12/2019 |

OTHER PUBLICATIONS

Taewon Song, et al "Multi-link Acknowledgement," IEEE 802.11-19/1887r0, XP68164347, Nov. 11, 2019, 15 pages.

(Continued)

*Primary Examiner* — Marceau Milord
(74) *Attorney, Agent, or Firm* — Conley Rose, P.C.

(57) ABSTRACT

A receiving station simultaneously receives a plurality of procedure protocol data units (PPDUs) from a sending station on a plurality of channels, where the plurality of PPDUs includes a plurality of media access control protocol data unit (MPDU) sets, and each of the plurality of MPDU sets includes at least a copy of a start MPDU. The receiving station sends a block acknowledgment on one or more channels of the plurality of channels, where the block acknowledgment includes acknowledgment information, and the acknowledgment information indicates acknowledgment of MPDUs successfully received on the plurality of channels and transmission quality of each of the plurality of MPDU sets.

20 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,917,220 | B2* | 2/2021 | Seok | H04L 5/0055 |
| 10,931,396 | B2* | 2/2021 | Ahn | H04L 1/1614 |
| 11,139,929 | B2* | 10/2021 | Cherian | H04L 1/189 |
| 11,470,506 | B2* | 10/2022 | Son | H04L 1/0084 |
| 11,540,168 | B2* | 12/2022 | Bajko | H04W 28/04 |
| 11,595,442 | B2* | 2/2023 | Wang | H04L 63/18 |
| 11,601,251 | B2* | 3/2023 | Seok | H04L 1/1896 |
| 11,664,926 | B2* | 5/2023 | Ahn | H04L 1/1614 370/329 |
| 11,765,779 | B2* | 9/2023 | Ho | H04W 80/02 |
| 2006/0126513 | A1* | 6/2006 | Li | H04L 1/1628 370/236 |
| 2012/0207087 | A1* | 8/2012 | Wentink | H04L 1/1621 370/328 |
| 2014/0233551 | A1* | 8/2014 | Wentink | H04L 69/22 370/338 |
| 2014/0314004 | A1* | 10/2014 | Zhou | H04L 5/0007 370/329 |
| 2015/0063320 | A1* | 3/2015 | Merlin | H04W 74/08 370/336 |
| 2015/0124689 | A1* | 5/2015 | Merlin | H04W 4/06 370/312 |
| 2015/0124690 | A1* | 5/2015 | Merlin | H04W 72/30 370/312 |
| 2015/0288501 | A1* | 10/2015 | Kwon | H04L 1/1614 370/329 |
| 2016/0226635 | A1* | 8/2016 | Chu | H04L 5/003 |
| 2016/0234831 | A1* | 8/2016 | Tian | H04W 72/121 |
| 2016/0248569 | A1* | 8/2016 | Ghosh | H04L 1/165 |
| 2017/0077999 | A1* | 3/2017 | Asterjadhi | H04B 7/024 |
| 2017/0093547 | A1* | 3/2017 | Merlin | H04L 1/1864 |
| 2017/0201343 | A1* | 7/2017 | Merlin | H04L 1/1614 |
| 2017/0244531 | A1 | 8/2017 | Chu et al. | |
| 2017/0310446 | A1* | 10/2017 | Asterjadhi | H04L 1/1685 |
| 2018/0076992 | A1* | 3/2018 | Nabetani | H04L 1/1845 |
| 2018/0184233 | A1* | 6/2018 | Alpert | H04L 5/001 |
| 2018/0206174 | A1* | 7/2018 | Zhou | H04B 1/0483 |
| 2019/0045537 | A1* | 2/2019 | Seok | H04L 1/1854 |
| 2020/0006361 | A1* | 1/2020 | Hsu | G11C 16/12 |
| 2020/0021400 | A1* | 1/2020 | Cherian | H04L 5/0055 |
| 2020/0052832 | A1* | 2/2020 | Tian | H04L 1/1614 |
| 2020/0288523 | A1* | 9/2020 | Patil | H04W 80/02 |
| 2021/0036809 | A1* | 2/2021 | Shellhammer | H04B 7/0456 |
| 2021/0036909 | A1* | 2/2021 | Nikain | H04L 41/0866 |
| 2021/0099256 | A1* | 4/2021 | Lee | H04L 1/1893 |
| 2021/0409156 | A1* | 12/2021 | Xu | H04L 1/1685 |
| 2022/0014965 | A1* | 1/2022 | Kawamura | H04W 28/04 |

OTHER PUBLICATIONS

Rojan Chitrakar (Panasonic): "Multi-link acknowledgment," IEEE 802311-19/1512r0, XP68153634, Sep. 10, 2019, 14 pages.

Ericsson, "On CWS adjustment based on HARQ-ACK feedback," 3GPP TSG RAN WG1 Meeting #82bis, R1-156034, Malm, Sweden, Oct. 5-9, 2015, 9 pages.

Kaouther Mansour et al., "Revisiting the IEEE 802.11n A-MPDU Retransmission Scheme," IEEE Communications Letters, vol. 23, No. 6, Jun. 2019, 4 pages.

* cited by examiner

| Media access control header | Acknowledgment information of media access control protocol data units successfully received on a plurality of channels | Transmission quality of a media access control protocol data unit set 1 | Transmission quality of a media access control protocol data unit set 2 |

FIG. 5

| Media access control header | Acknowledgment bitmap of a successfully received media access control protocol data unit | Indication information of a quantity of successfully transmitted media access control protocol data units in a media access control protocol data unit set 1 | Indication information of a quantity of successfully transmitted media access control protocol data units in a media access control protocol data unit set 2 |

FIG. 6

| Media access control header | Acknowledgment information of media access control protocol data units successfully received on a plurality of channels | Indication information of a ratio of a quantity of successfully transmitted media access control protocol data units in a media access control protocol data unit set 1 to a total quantity of media access control protocol data units in the media access control protocol data unit set 1 | Indication information of a ratio of a quantity of successfully transmitted media access control protocol data units in a media access control protocol data unit set 2 to a total quantity of media access control protocol data units in the media access control protocol data unit set 2 |
|---|---|---|---|

FIG. 7

| Media access control header | Acknowledgment bitmap of a successfully received media access control protocol data unit in a media access control protocol data unit set 1 | Acknowledgment bitmap of a successfully received media access control protocol data unit in a media access control protocol data unit set 2 |
|---|---|---|

WIRELESS LOCAL AREA NETWORK TRANSMISSION METHOD AND DEVICE, AND TRANSCEIVER

CROSS-REFERENCE TO RELATED APPLICATIONS

This is a continuation of International Patent Application No. PCT/CN2020/115915 filed on Sep. 17, 2020, which claims priority to Chinese Patent Application No. 201911330663.9 filed on Dec. 20, 2019. The disclosures of the aforementioned applications are hereby incorporated by reference in their entireties.

TECHNICAL FIELD

This disclosure relates to the field of communications technologies, and in particular, to a wireless local area network (WLAN) transmission method and device, and a transceiver.

BACKGROUND

A WLAN technology is widely used in home and enterprise networks. When the WLAN technology is used for accessing a channel, a contention mechanism based on carrier sense multiple access with collision avoidance (CSMA/CA) is used for wireless channel occupation. Before sending data, a station (STA) or an access point (AP) first monitors a channel status. If the channel remains idle for a period of time, random backoff is performed. If the channel is still idle after backoff, data transmission can be started. Therefore, there is great uncertainty about channel access, an access delay is random, and the sending station needs to learn quality of the data transmitted by the sending station on the channel.

SUMMARY

This disclosure provides a wireless local area network transmission method and device, and a transceiver, to obtain quality of data transmitted on a channel.

According to a first aspect, a WLAN transmission method is provided, where the method includes: A receiving station simultaneously receives a plurality of physical layer convergence procedure protocol data units (PPDUs) from a sending station on a plurality of channels, where each of the plurality of channels has one PPDU of the plurality of PPDUs, the plurality of PPDUs includes a plurality of media access control protocol data unit (MPDU) sets, each of the plurality of PPDUs includes one MPDU set of the plurality of MPDU sets, and each of the plurality of MPDU sets includes at least a copy of a start MPDU. The receiving station sends a block acknowledgment on one or more channels of the plurality of channels, where the block acknowledgment includes acknowledgment information, and the acknowledgment information indicates acknowledgment of MPDUs successfully received on the plurality of channels and transmission quality of each of the plurality of MPDU sets.

When the sending station transmits data through the plurality of channels, the sending station receives the block acknowledgment sent by the receiving station, and can obtain a transmission result of each channel while obtaining an overall transmission result of the plurality of channels, so that the sending station can obtain an overall transmission effect and transmission quality of each channel.

According to a second aspect, a WLAN transmission method is provided, where the method includes: A sending station simultaneously sends a plurality of PPDUs to a receiving station on a plurality of channels, where each of the plurality of channels has one PPDU of the plurality of PPDUs, the plurality of PPDUs include a plurality of MPDU sets, each of the plurality of PPDUs includes one MPDU set of the plurality of MPDU sets, and each of the plurality of MPDU sets includes at least a copy of a start MPDU. The sending station receives a block acknowledgment from the receiving station on one or more channels of the plurality of channels, where the block acknowledgment includes acknowledgment information, and the acknowledgment information indicates acknowledgment of MPDUs successfully received on the plurality of channels and transmission quality of each of the plurality of MPDU sets.

When the receiving station receives data sent by the sending station through the plurality of channels, the receiving station further sends a transmission result of each channel to the sending station while sending an overall result of transmission on the plurality of channels to the sending station.

With reference to the second aspect, in an implementation, the method further includes: The sending station adjusts a transmission parameter based on the transmission quality of each of the plurality of MPDU sets.

The adjusting the parameter may be, for example, adjusting a rate of a channel whose transmission quality is lower than a preset value. When a success rate of transmitting an MPDU set on a channel is low, that is, transmission quality is lower than the preset value, a rate of the channel may be reduced to improve a success rate of transmission on the channel.

With reference to any one of the first aspect, the second aspect, or the implementations of the foregoing aspects, in still another implementation, the acknowledgment information includes an acknowledgment bitmap of the successfully received MPDU and a quantity of successfully transmitted MPDUs in each of the plurality of MPDU sets.

With reference to any one of the first aspect, the second aspect, or the implementations of the foregoing aspects, in still another implementation, the acknowledgment information includes the acknowledgment bitmap of the successfully received MPDU and a ratio of the quantity of successfully transmitted MPDUs in each of the plurality of MPDU sets to a total quantity of MPDUs in a corresponding MPDU set.

With reference to any one of the first aspect, the second aspect, or the implementations of the foregoing aspects, in still another implementation, the acknowledgment information includes a plurality of acknowledgment bitmaps, where each of the plurality of acknowledgment bitmaps is an acknowledgment bitmap of a successfully received MPDU in each of the plurality of MPDU sets.

According to a third aspect, a transceiver is provided, where the transceiver includes: a receiver, configured to simultaneously receive a plurality of PPDUs from a sending station on a plurality of channels, where each of the plurality of channels has one PPDU of the plurality of PPDUs, the plurality of PPDUs include a plurality of MPDU sets, each of the plurality of PPDUs includes one MPDU set of the plurality of MPDU sets, and each of the plurality of MPDU sets includes at least a copy of a start MPDU; and a transmitter, configured to send a block acknowledgment on one or more channels of the plurality of channels, where the block acknowledgment includes acknowledgment information, and the acknowledgment information indicates acknowledgment of MPDUs successfully received on the plurality of channels and transmission quality of each of the plurality of MPDU sets.

According to a fourth aspect, a transceiver is provided, where the transceiver includes: a transmitter, configured to simultaneously send a plurality of PPDUs to a receiving station on a plurality of channels, where each of the plurality of channels has one PPDU of the plurality of PPDUs, the plurality of PPDUs include a plurality of MPDU sets, each of the plurality of PPDUs includes one MPDU set of the plurality of MPDU sets, and each of the plurality of MPDU sets includes at least a copy of a start MPDU; and a receiver, configured to receive a block acknowledgment from the receiving station on one or more channels of the plurality of channels, where the block acknowledgment includes acknowledgment information, and the acknowledgment information indicates acknowledgment of MPDUs successfully received on the plurality of channels and transmission quality of each of the plurality of MPDU sets.

With reference to any one of the third aspect, the fourth aspect, or the implementations of the foregoing aspects, in still another implementation, the acknowledgment information includes an acknowledgment bitmap of the successfully received MPDU and a quantity of successfully transmitted MPDUs in each of the plurality of MPDU sets.

With reference to any one of the third aspect, the fourth aspect, or the implementations of the foregoing aspects, in still another implementation, the acknowledgment information includes the acknowledgment bitmap of the successfully received MPDU and a ratio of the quantity of successfully transmitted MPDUs in each of the plurality of MPDU sets to a total quantity of MPDUs in a corresponding MPDU set.

With reference to any one of the third aspect, the fourth aspect, or the implementations of the foregoing aspects, in still another implementation, the acknowledgment information includes a plurality of acknowledgment bitmaps, where each of the plurality of acknowledgment bitmaps is an acknowledgment bitmap of a successfully received MPDU in each of the plurality of MPDU sets.

According to a fifth aspect, a WLAN transmission device is provided, where the device includes a transceiver according to any one of the third aspect or the implementations of the third aspect.

According to a sixth aspect, a WLAN transmission device is provided, where the device includes a transceiver according to any one of the fourth aspect or the implementations of the fourth aspect.

With reference to the sixth aspect, in an implementation, the WLAN device further includes a processor. The processor is configured to adjust a transmission parameter based on transmission quality of each MPDU set in a plurality of MPDU sets.

According to a seventh aspect, a WLAN system is provided, including the WLAN device according to the fifth aspect and the WLAN device according to any one of the sixth aspect or the implementations of the sixth aspect.

According to an eighth aspect, a computer-readable storage medium is provided, where the computer-readable storage medium stores instructions. When the instructions are run on a computer, the computer is enabled to perform the methods according to the foregoing aspects.

According to a ninth aspect, a computer program product including instructions is provided. When the computer program product is run on a computer, the computer is enabled to perform the methods according to the foregoing aspects.

DESCRIPTION OF EMBODIMENTS

Figure 1:
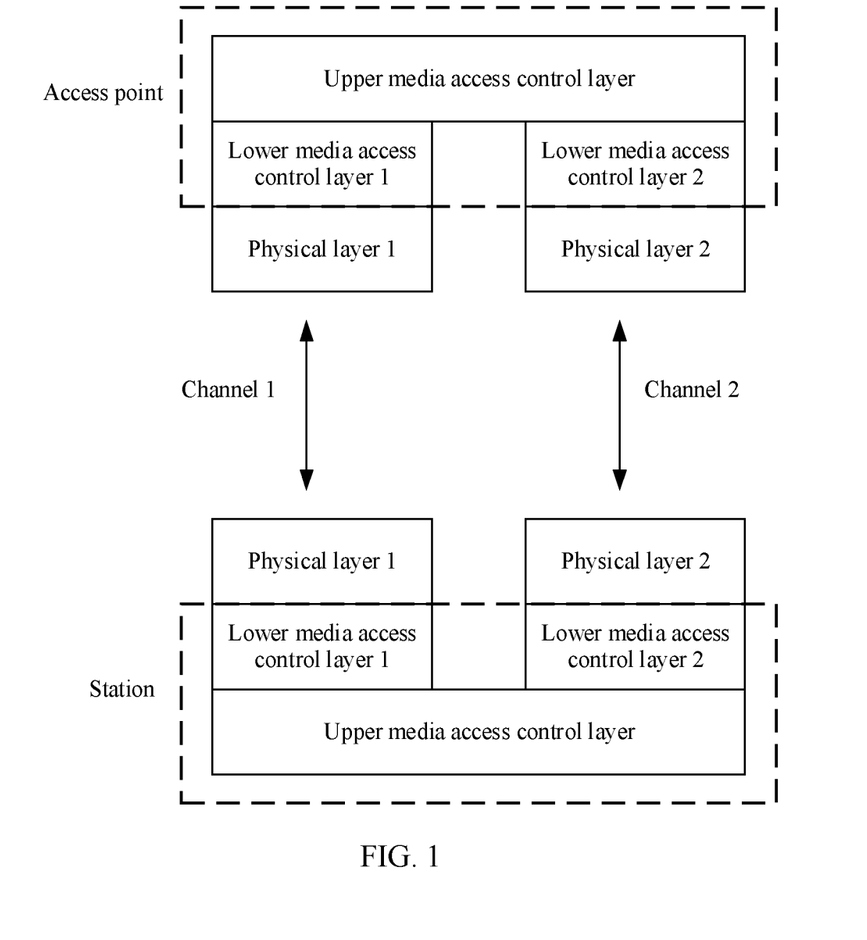
FIG. 1 is a schematic diagram of a multilink transmission architecture.

In a schematic diagram of a multilink transmission architecture shown in FIG. 1, one device may include at least two media access control (MAC) entities and at least two physical layer (PHY) entities. The device performs data transmission by using the two MAC entities and two PHY entities. This mechanism can reduce a network delay.

Figure 2:
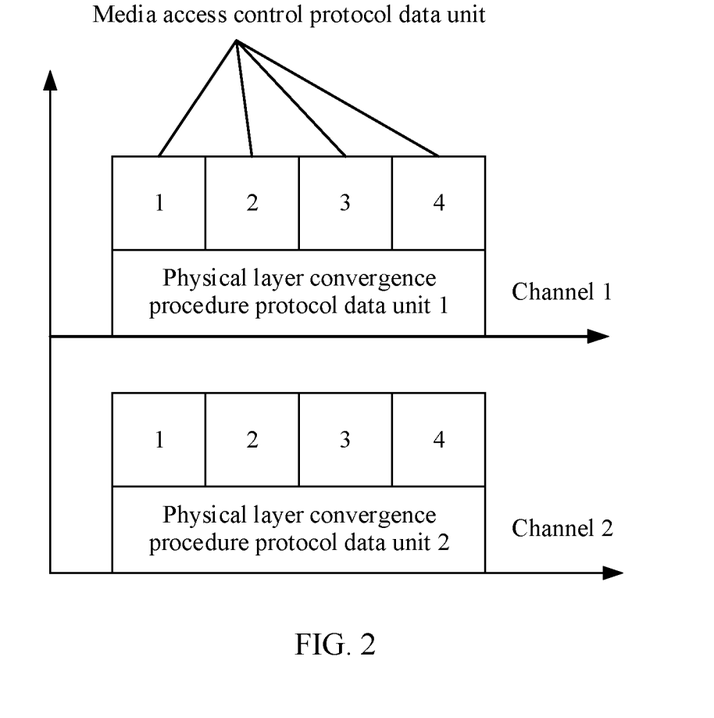
FIG. 2 is a schematic diagram of a duplicated transmission mode.

Therefore, a sending station and a receiving station may communicate with each other by using a plurality of channels. FIG. 2 is a schematic diagram of a duplicated transmission mode. To improve transmission reliability, the duplicated transmission mode is provided, that is, a same MPDU is transmitted on each channel. A physical packet header is added to the MPDU, and the MPDU is encapsulated into a physical layer convergence procedure protocol data unit (PPDU).

The receiving station acknowledges PPDUs of a plurality of channels from the sending station by using a block acknowledgment (block acknowledgment or block ack (BA) frame.

Figure 3:
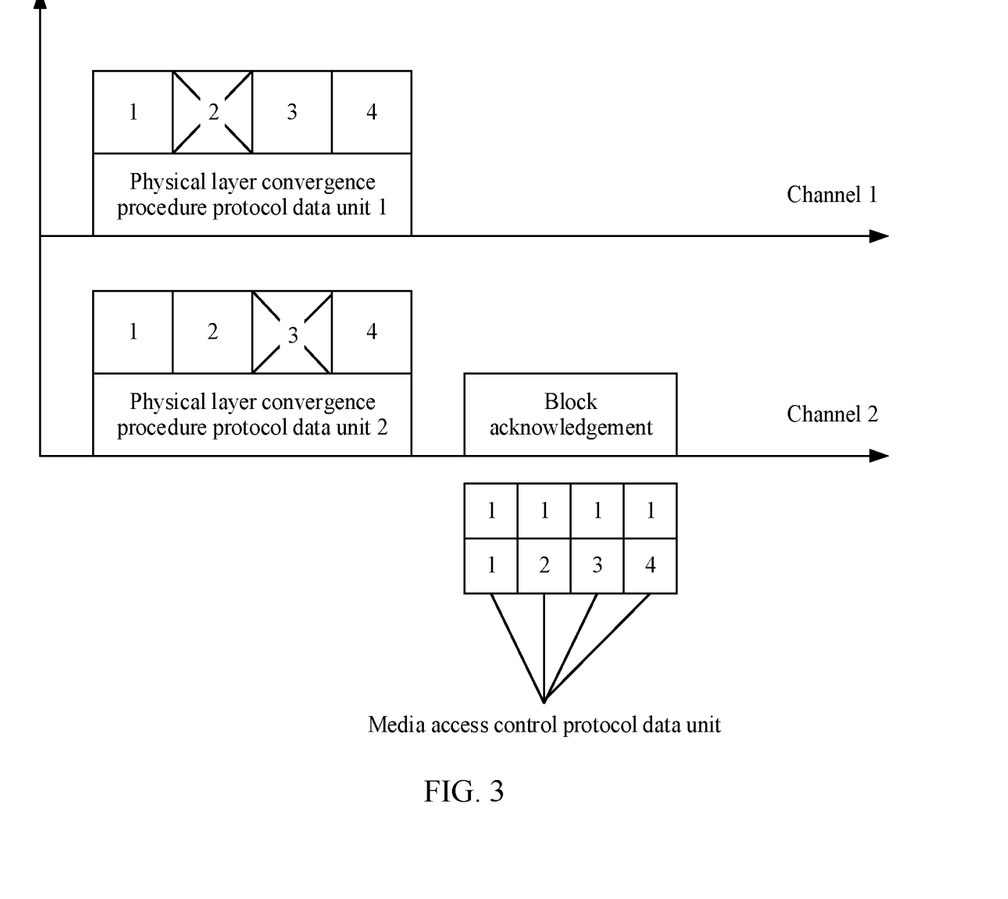
FIG. 3 is a schematic diagram of a transmission result reply manner.

FIG. 3 is a schematic diagram of a transmission result reply manner. An overall transmission result of all the channels is fed back through one or several channels of the plurality of channels. In FIG. 3, both a channel 1 and a channel 2 transmit MPDUs 1 to 4. ABA is used only on the channel 2 to feed back a transmission result (if the MPDUs are successfully transmitted on either channel, it is considered that an overall transmission result of the channels is successful). In this case, the sending station cannot obtain a transmission result of each channel.

This disclosure provides a WLAN transmission solution. When a sending station transmits data through a plurality of channels, the sending station receives a block acknowledgment sent by a receiving station, and can obtain a transmission result of each channel while obtaining an overall transmission result of the plurality of channels, so that the sending station can obtain an overall transmission effect and transmission quality of each channel.

Solutions in embodiments of this disclosure can be applied to the multilink transmission architecture shown in FIG. 1. To be specific, one device may have at least two MAC entities and at least two PHY entities. The device performs data transmission by using the at least two MAC entities and the at least two PHY entities. A wireless local area network device that sends data is referred to as a sending station, and a wireless local area network device that receives data is referred to as a receiving station. Usually, a wireless local area network device can send and receive data.

The wireless local area network device may be an AP or a STA. The AP is also referred to as a hotspot. The AP is an entity including a STA, and the entity provides an access to a distributed service, through a wireless medium (WM), for associated STA. One AP includes a STA and has a distribution system access function (DSAF). The STA is an individually addressable entity connected to a MAC interface and a PHY interface of the WM.

Figure 4:
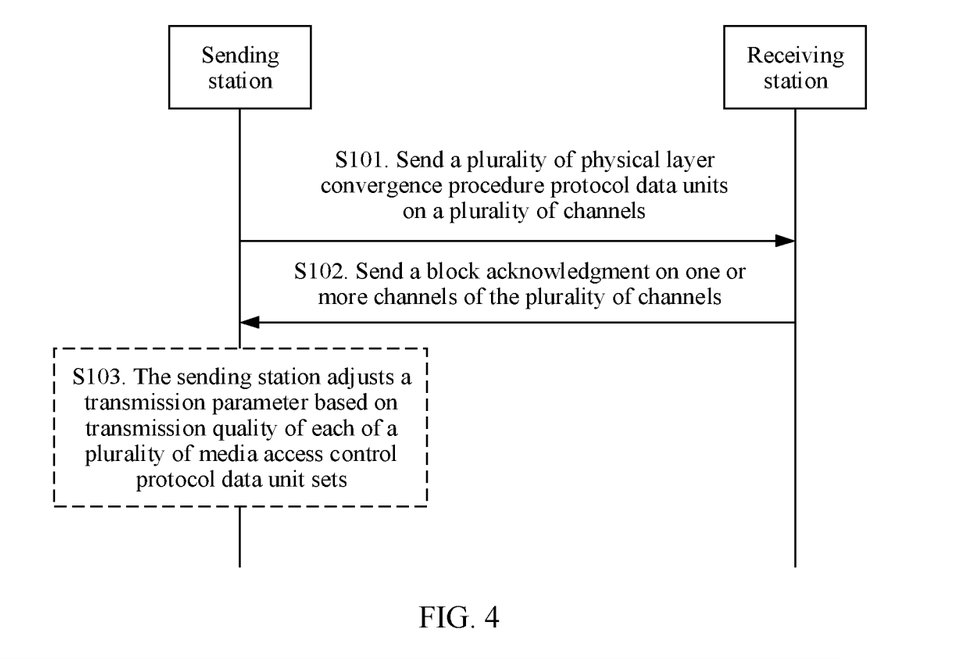
FIG. 4 is a schematic flowchart of a wireless local area network transmission method according to an embodiment of this disclosure.

FIG. 4 is a schematic flowchart of a wireless local area network transmission method according to an embodiment of this disclosure. The method may include S101 and S102, and may further include S103.

S101. A sending station simultaneously sends a plurality of PPDUs to a receiving station on a plurality of channels.

Correspondingly, the receiving station receives the plurality of PPDUs.

As shown in FIG. 1, the sending station and the receiving station may communicate with each other by using the plurality of channels or a plurality of links. To improve transmission reliability, the sending station uses a duplicated transmission mode. To be specific, one or more MPDUs (referred to as an MPDU set) are transmitted on one channel, and copies of one or more MPDUs of the foregoing channel are transmitted on another channel. Optionally, an MPDU set transmitted on the other channel includes at least a copy of a start MPDU in the MPDU set. Therefore, MPDUs transmitted on all the channels are all the same or partially the same.

Then, by adding a physical packet header to each MPDU set, the sending station encapsulates the MPDU set into a PPDU. The sending station sends a plurality of PPDUs to the receiving station on a plurality of channels. Therefore, for the plurality of sent PPDUs, there is one PPDU on the plurality of PPDUs on each of the plurality of channels; the plurality of PPDUs include a plurality of MPDU sets; and each of the plurality of PPDUs includes one MPDU set of the plurality of MPDU sets.

The start MPDU is an MPDU that is first sent in the MPDU set. The MPDU set transmitted on the other channel including at least the copy of the start MPDU in the MPDU set means that the MPDU set transmitted on the other channel includes the copy of the start MPDU in the MPDU set, and certainly, may further include a plurality of MPDUs other than the start MPDU in the MPDU set. Copies of MPDUs included in the MPDU sets transmitted on the plurality of channels may be partially the same, or may be all the same. For example, the sending station sends an MPDU set: MPDUs whose sequence numbers are respectively 11, 14, 15, and 16. The sending station does not send MPDUs whose sequence numbers are 12 and 13. Each MPDU includes a sequence number of the MPDU. A quantity of MPDUs sent by the sending station is unknown to the receiving station. The receiving station successfully receives the MPDUs with the sequence numbers 11, 14, 15, and 16, and identifies the sequence numbers of the MPDUs. Then, the receiving station returns a transmission result 1,00,1,1,1 to the sending station, where a bit "1" indicates that transmission succeeds, and a bit "0" indicates that transmission fails or data is not received. It can be learned that the receiving station performs acknowledgement and replying based on the start MPDU.

It may be understood that the MPDU set may alternatively include one MPDU, which is the start MPDU in this case.

S102. The receiving station sends a block acknowledgment on one or more channels of the plurality of channels.

Correspondingly, the sending station receives the block acknowledgment from the receiving station on one or more channels of the plurality of channels.

Figure 5:
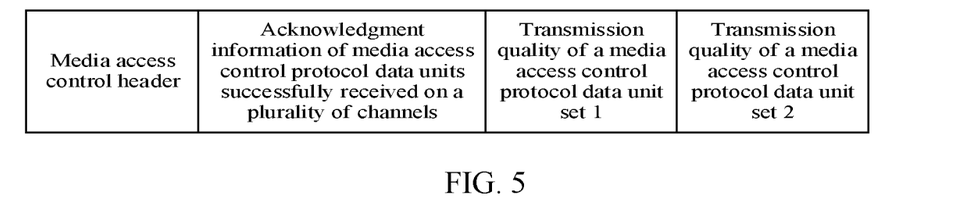
FIG. 5 is a schematic diagram of a format of a block acknowledgment field in FIG. 4.

In this embodiment, the receiving station acknowledges a PPDU of one channel or PPDUs of a plurality of channels from the sending station by using a BA frame. Specifically, the receiving station may send a block acknowledgment on each of the plurality of channels, or may send a block acknowledgment on one channel, or may send block acknowledgments on several channels of the plurality of channels. The block acknowledgment includes acknowledgment information, and the acknowledgment information indicates acknowledgment of MPDUs successfully received on the plurality of channels and transmission quality of each of the plurality of MPDU sets. FIG. 5 is a schematic diagram of a format of a block acknowledgment field. The BA frame includes acknowledgment information of MPDUs successfully received on a plurality of channels and transmission quality of a plurality of MPDU sets, such as transmission quality of an MPDU set 1 and transmission quality of an MPDU set 2. The BA frame may further include a MAC header. The acknowledgment information may be included in one or more BA frames.

The foregoing acknowledgment information indicates acknowledgment of the MPDUs successfully received on the plurality of channels, and is acknowledgment of an overall result of MPDU transmission on the plurality of channels. For example, the MPDU set 1 including MPDUs 1 to 4 is transmitted on a channel A, and the MPDU set 2 including MPDUs 1 to 4 is transmitted on a channel B. If the MPDUs 1, 3, and 4 on the channel A are successfully transmitted, and the MPDUs 1, 2, and 4 on the channel B are successfully transmitted, the receiving station provides a feedback, to the sending station, that all the MPDUs 1 to 4 are successfully transmitted. It may be understood that the indication for acknowledgment of the MPDUs successfully received on the plurality of channels may also be obtained based on the transmission quality of each of the plurality of MPDU sets.

The foregoing acknowledgment information indicates the transmission quality of each of the plurality of MPDU sets, and therefore is used to indicate transmission quality of each MPDU set on each channel. The transmission quality may be a quantity of successfully transmitted MPDUs, a quantity of MPDUs that fail to be transmitted, an identifier of a successfully transmitted MPDU, an identifier of an MPDU that fails to be transmitted, and the like in the MPDU set on the channel.

Therefore, the sending station obtains an overall result of transmission on the plurality of channels, and further obtains a transmission result of each channel.

Further, the method may further include the following step.

S103. The sending station adjusts a transmission parameter based on the transmission quality of each of the plurality of MPDU sets.

After obtaining the transmission quality of each of the plurality of MPDU sets, the sending station determines a channel whose transmission quality is lower than a preset value, and may dynamically adjust a transmission parameter of the channel. For example, a rate of the channel is adjusted, to improve transmission reliability of the channel and improve service quality of a system.

If the transmission quality of each MPDU set is represented by the quantity of successfully transmitted MPDUs, the transmission quality being lower than the preset value means that the quantity of successfully transmitted MPDUs in the MPDU set is lower than a preset quantity.

The transmission quality of each MPDU set may also be represented by the quantity of MPDUs that fail to be transmitted. When the quantity of MPDUs that fail to be transmitted is greater than the preset quantity, it may be considered that the transmission quality is lower than the preset value.

According to the wireless local area network transmission method provided in this embodiment of this disclosure, when the sending station transmits data through the plurality of channels, the receiving station further sends the transmission result of each channel to the sending station while sending the overall result of transmission on the plurality of channels to the sending station. The sending station can further obtain the transmission result of each channel while obtaining the overall result of transmission on the plurality of channels, so that the sending station can obtain an overall transmission effect of the plurality of channels and the transmission quality of each channel. In addition, the sending station can further perform adaptive adjustment on a single channel, which improves channel reliability and the service quality of the system.

Specifically, the acknowledgment information in the BA frame may be implemented in the following several manners.

In an implementation, the acknowledgment information includes an acknowledgment bitmap of the successfully received MPDU and a quantity of successfully transmitted MPDUs in each of the plurality of MPDU sets.

Figure 6:
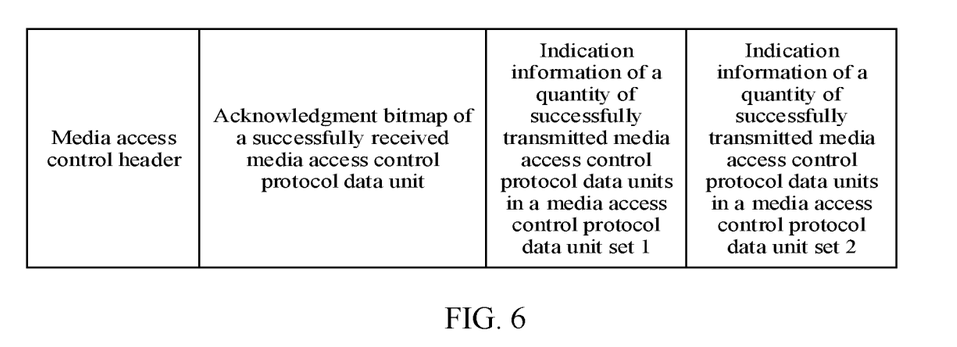
FIG. 6 is a schematic diagram of a format of a block acknowledgment field in a specific implementation.

FIG. 6 is a schematic diagram of a format of a block acknowledgment field in a specific implementation. The acknowledgment information includes an acknowledgment bitmap of a successfully received MPDU, indication information of a quantity of successfully transmitted MPDUs in an MPDU set 1, indication information of a quantity of successfully transmitted MPDUs in an MPDU set 2, and the like.

In the acknowledgment information, the acknowledgment bitmap of the successfully received MPDU means that bit information is used to indicate whether each MPDU is successfully transmitted. For example, a bit "1" is used to indicate that transmission succeeds, and a bit "0" is used to indicate that transmission fails. For example, the MPDU set 1 includes MPDUs 1 to 4, where MPDUs 1, 2, and 4 are successfully transmitted, and MPDU 3 fails to be transmitted. In this case, an acknowledgment bitmap of the MPDU set is "1101".

Alternatively, if all the MPDUs are successfully transmitted, whether each MPDU is successfully transmitted may not be indicated one by one. Instead, one bit is used to indicate that all MPDUs are successfully transmitted.

In this acknowledgment information, several bits may be used to indicate the quantity of MPDUs successfully transmitted in each MPDU set. A maximum quantity of MPDUs in the MPDU set may reach 256. In this case, eight bits may be used to indicate a quantity of successfully transmitted MPDUs in a single MPDU set.

After receiving the foregoing acknowledgment information, the sending station may learn, according to the acknowledgment bitmap of the successfully received MPDU, whether each MPDU between the sending station and the receiving station is successfully transmitted, to learn service quality of a communications system including the sending station and the receiving station. In addition, a transmission effect of each channel may be learned according to the quantity of successfully transmitted MPDUs in each MPDU set. For a channel whose quantity of successfully transmitted MPDUs in an MPDU set is lower than a specified value, adaptive adjustment may be performed on the channel, to dynamically adjust a transmission parameter of the channel, for example, adjust a rate of the channel, to improve reliability of the communications system.

For example, it is assumed that four MPDUs are transmitted on each of a channel 1 and a channel 2. According to the foregoing acknowledgment information, overall, it is determined that each MPDU is successfully transmitted, but two MPDUs are successfully transmitted on the channel 1, and four MPDUs are successfully transmitted on the channel 2. It may be determined that a transmission effect of the channel 1 is relatively poor, and a rate of the channel may be adjusted, to improve transmission reliability of the channel.

In another implementation, the acknowledgment information includes the acknowledgment bitmap of the successfully received MPDU and a ratio of the quantity of successfully transmitted MPDUs in each of the plurality of MPDU sets to a total quantity of MPDUs in a corresponding MPDU set.

Figure 7:
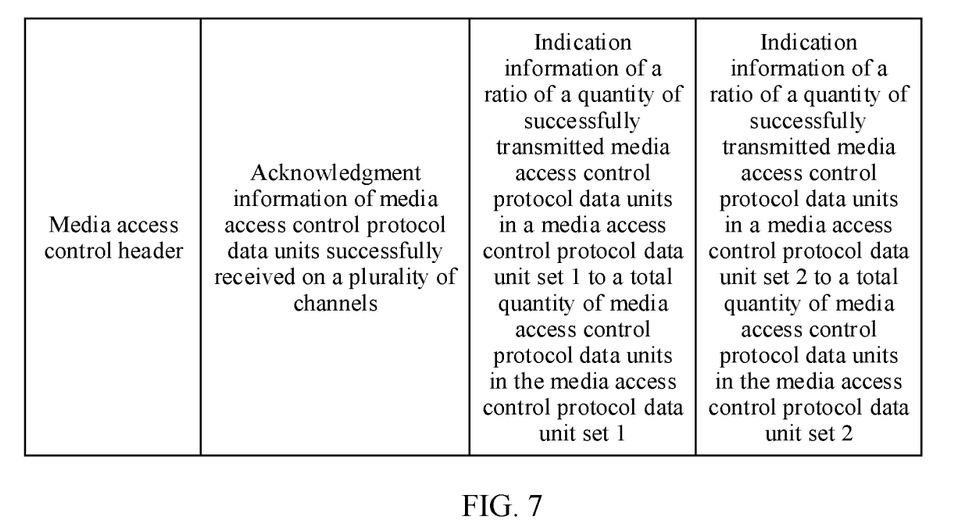
FIG. 7 is a schematic diagram of a format of a block acknowledgment field in another specific implementation.

FIG. 7 is a schematic diagram of another format of a block acknowledgment field in a specific implementation. The acknowledgment information includes an acknowledgment bitmap of a successfully received MPDU, indication information of a ratio of a quantity of successfully transmitted MPDUs in each MPDU set in an MPDU set 1 to a total quantity of MPDUs in the corresponding MPDU set 1, indication information of a ratio of a quantity of successfully transmitted MPDUs in each MPDU set in an MPDU set 2 to a total quantity of MPDUs in the corresponding MPDU set 2, and the like.

For a description of the acknowledgment bitmap of the successfully received MPDU in the acknowledgment information, refer to the descriptions in the foregoing implementations.

In the plurality of MPDU sets, total quantities of MPDUs in the MPDU sets may be the same or may be different. The receiving station does not learn in advance the quantities of MPDUs included in the MPDU sets transmitted by the sending station. The receiving station may estimate a quantity of MPDUs included in a single MPDU set. For example, the receiving station may estimate, based on a time point at which one MPDU is successfully received and a time point at which a next MPDU is received, whether there is an MPDU not received between the previous successfully received MPDU and the next successfully received MPDU, to estimate the quantity of MPDUs included in the single MPDU set.

When receiving the MPDU on each channel, the receiving station calculates the ratio of the quantity of successfully transmitted MPDUs in each MPDU set to the total quantity of MPDUs in the corresponding MPDU set. Then, bit information is used to indicate the ratio. For example, if the ratio is greater than 80%, a bit "1" is used for indication; if the ratio is less than or equal to 80%, a bit "0" is used for indication. Alternatively, if the ratio is greater than 80%, the bit "0" is used for indication; if the ratio is less than or equal to 80%, the bit "1" is used for indication.

A correspondence between a plurality of ratio ranges and indication information may be further set. For example, two bits may be used to indicate four ratio ranges. Specifically, bits "11" are used to indicate that the ratio is greater than 90%, bits "10" are used to indicate that the range of the ratio is 80% to 90%, bits "01" are used to indicate that the range of the ratio is "60% to 80%", and bits "00" are used to indicate that the ratio is less than 60%. In this way, the sending station may obtain a more accurate ratio of the quantity of successfully transmitted MPDUs in each MPDU set to the total quantity of MPDUs in the corresponding MPDU set.

The sending station may learn an effect of MPDU transmission of each channel after obtaining the ratio of the quantity of successfully transmitted MPDUs in each MPDU set to the total quantity of MPDUs in the corresponding MPDU set. For a channel on which a ratio of a quantity of successfully transmitted MPDUs in each MPDU set to a total quantity of MPDUs in the corresponding MPDU set is lower than a specified value, a rate of the channel may be adjusted, to improve transmission reliability of the channel.

In still another implementation, the acknowledgment information includes a plurality of acknowledgment bitmaps, where each of the plurality of acknowledgment bitmaps is an acknowledgment bitmap of a successfully received MPDU in each of the plurality of MPDU sets.

Figure 8:
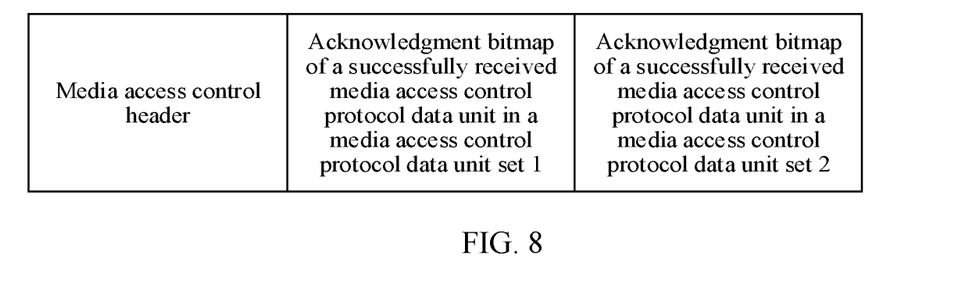
FIG. 8 is a schematic diagram of a format of a block acknowledgment field in another specific implementation.

FIG. 8 is a schematic diagram of still another format of a block acknowledgment field in a specific implementation. The acknowledgment information includes an acknowledgment bitmap of a successfully received MPDU in each MPDU set, for example, an acknowledgment bitmap of a successfully received MPDU in an MPDU set 1, and an acknowledgment bitmap of a successfully received MPDU in an MPDU set 2. The acknowledgment bitmap means that bit information is used to indicate whether each MPDU in an MPDU set is successfully transmitted.

For example, it is assumed that a bit "1" is used to indicate that the MPDU is transmitted successfully, and a bit "0" is used to indicate that the MPDU fails to be transmitted. It is assumed that the MPDU set 1 includes MPDUs 1 to 4, where the MPDUs 1 to 3 are successfully transmitted, and the MPDU 4 fails to be transmitted, an acknowledgment bitmap of the successfully received MPDUs in the MPDU set 1 is "1110".

After obtaining the acknowledgment bitmap of the successfully received MPDU in each MPDU set, the sending station may learn whether each MPDU on a plurality of channels is successfully transmitted. For example, the MPDU set 1 is sent on a channel 1, the MPDU set 2 is sent on a channel 2, and both the MPDU set 1 and the MPDU set 2 include MPDUs 1 to 4. The receiving station provides a feedback that an acknowledgment bitmap of successfully received MPDUs in the MPDU set 1 is "1110", and an acknowledgment bitmap of successfully received MPDUs in the MPDU set 2 is "1111". In this case, the sending station may determine that all the MPDUs sent by the sending station are successfully received.

Figure 9:
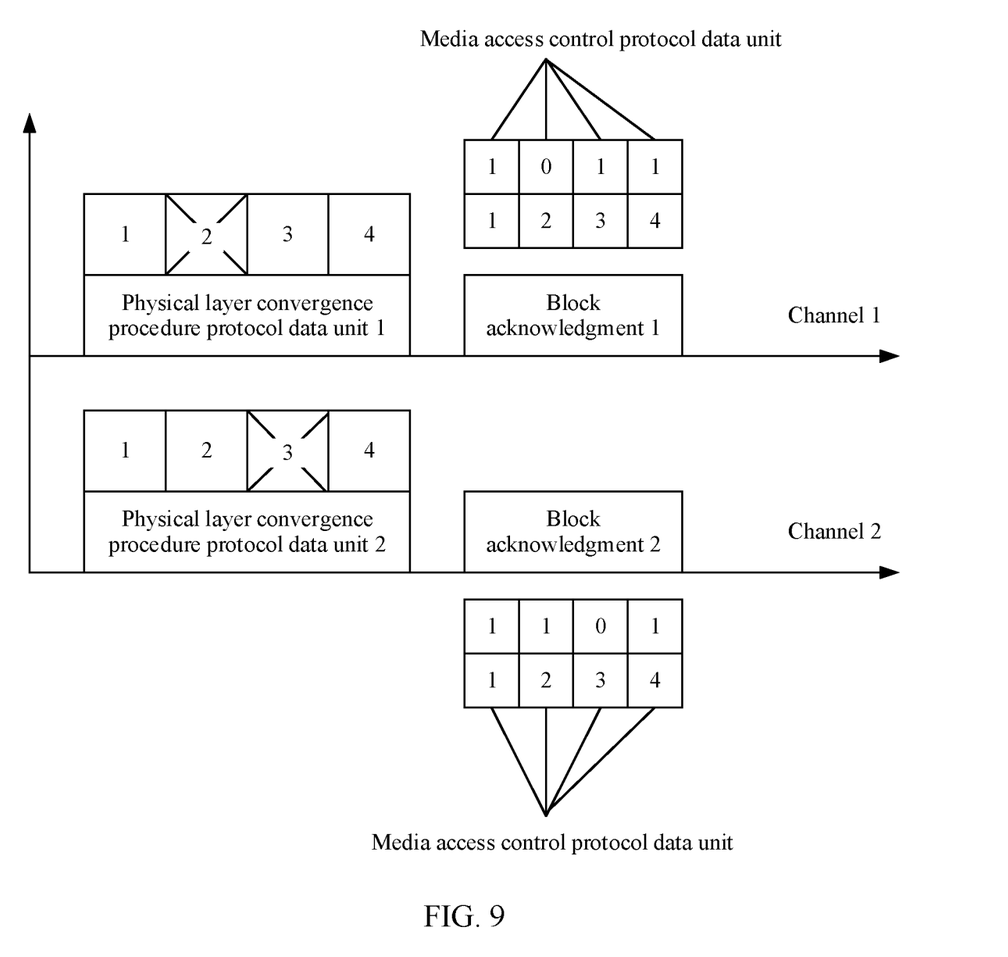
FIG. 9 is a schematic diagram of sending a block acknowledgment.

The foregoing plurality of acknowledgment bitmaps may be combined and sent to the sending station through one channel. Alternatively, a transmission result of each channel may be separately provided, and the sending station combines transmission results of these channels to obtain an overall transmission result. FIG. 9 is a schematic diagram of sending a block acknowledgment. Each channel independently replies with a transmission result of an MPDU transmitted on the channel. In FIG. 9, MPDUs 1 to 4 are transmitted on a channel 1, and the MPDU 2 fails to be transmitted. In this case, a BA 1 uses a bitmap to indicate that the MPDU 2 fails to be transmitted and the MPDUs 1, 3, and 4 are successfully transmitted. MPDUs 1 to 4 are also transmitted on the channel 2, and the MPDU 3 fails to be transmitted. A BA 2 uses a bitmap to indicate that the MPDU 3 fails to be transmitted and the MPDUs 1, 2, and 4 are successfully transmitted. The BA 1 and the BA 2 may be replied on different channels, or may be replied on a same channel. If the BA 1 and the BA 2 are replied in one channel, one BA frame may be used to carry bitmaps of a plurality of channels.

Figure 10:
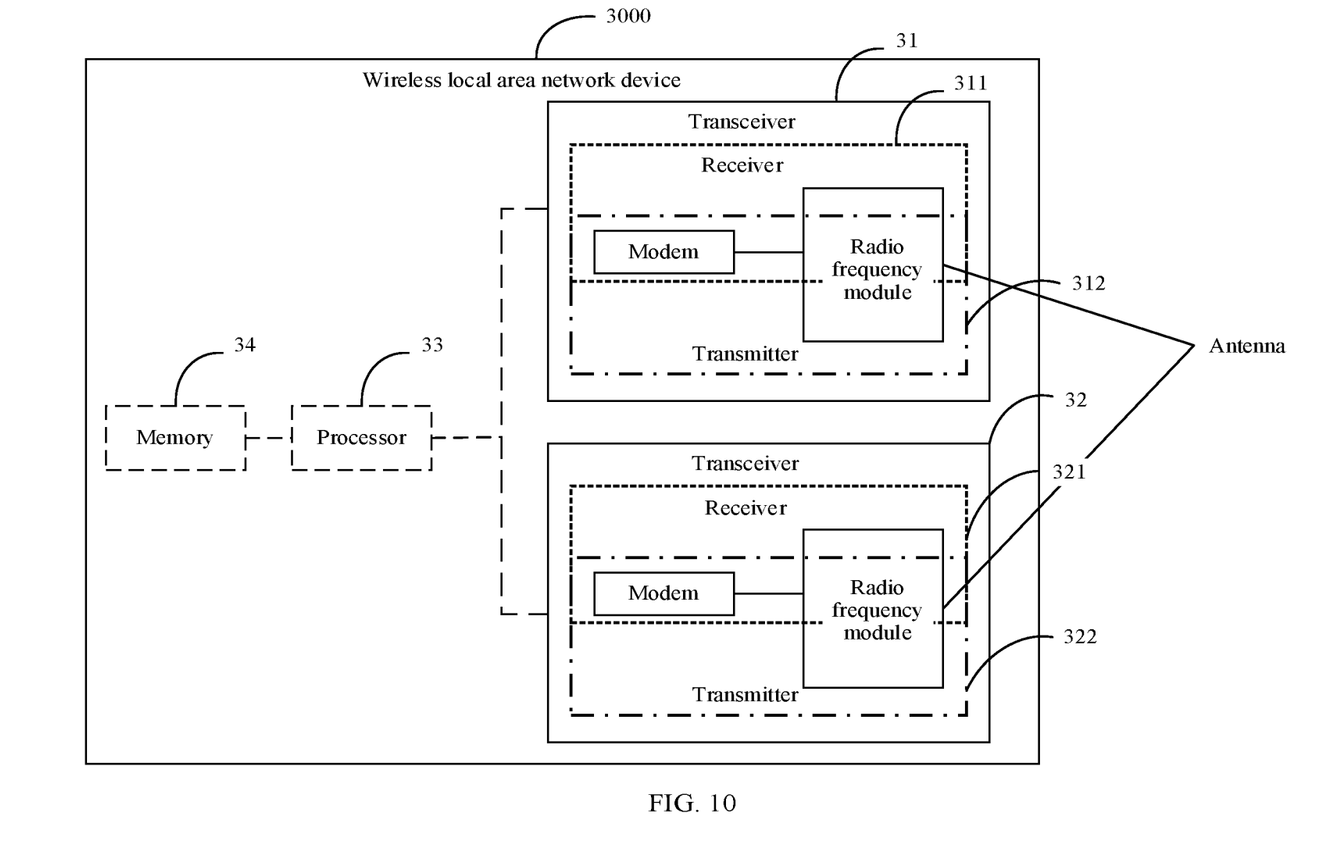
FIG. 10 is a schematic diagram of a structure of a WLAN device according to an embodiment of this disclosure.

As shown in FIG. 10, an embodiment of this disclosure further provides a WLAN device. The device 3000 may be the sending station or the receiving station in FIG. 4. The device 3000 performs multichannel communication. For example, if two channels are used for communication, the device 3000 may include a transceiver 31 and a transceiver 32. The transceiver 31 may perform communication on one channel, and the transceiver 32 may perform communication on another channel.

The transceiver 31 includes a receiver 311 and a transmitter 312. The transceiver 311 includes a radio frequency module, and the radio frequency module may perform sending and receiving. The receiver 311 includes a receiving circuit part of the radio frequency module, and may further include some other peripheral circuits. The transmitter 312 includes a sending circuit part of the radio frequency module, and may further include some peripheral circuits. The receiver 311 and the transmitter 312 share one modem. The receiver 311 and the transmitter 312 may be independent components, or may be integrated into one transceiver 31. The transceiver 31 may further include a memory, and the memory is configured to store a method procedure performed by the transceiver 31.

The transceiver 32 includes a receiver 321 and a transmitter 322. The transceiver 321 includes a radio frequency module, and the radio frequency module may perform sending and receiving. The receiver 321 includes a receiving circuit part of the radio frequency module, and may further include some other peripheral circuits. The transmitter 322 includes a sending circuit part of the radio frequency module, and may further include some peripheral circuits. The receiver 321 and the transmitter 322 share one modem. The receiver 321 and the transmitter 322 may be independent components, or may be integrated into one transceiver 32. The transceiver 32 may further include a memory, and the memory is configured to store a method procedure performed by the transceiver 32.

The radio frequency module of the transceiver 31 and the radio frequency module of the transceiver 32 may be connected to a same antenna.

Specifically, in an embodiment, the device 3000 is the receiving station. The device 3000 includes the transceiver 31 and the transceiver 32, and the transceiver 31/transceiver 32 includes the receiver and the transmitter. The receiver is configured to simultaneously receive a plurality of PPDUs from a sending station on a plurality of channels, where each of the plurality of channels has one PPDU of the plurality of PPDUs, the plurality of PPDUs include a plurality of MPDU sets, each of the plurality of PPDUs includes one MPDU set of the plurality of MPDU sets, and each of the plurality of MPDU sets includes at least a copy of a start MPDU.

The transmitter is configured to send a block acknowledgment on one or more channels of the plurality of channels, where the block acknowledgment includes acknowledgment information, and the acknowledgment information indicates acknowledgment of MPDUs successfully received on the plurality of channels and transmission quality of each of the plurality of MPDU sets.

In still another embodiment, the device 3000 is the sending station. The device 3000 includes the transceiver 31 and the transceiver 32, and the transceiver 31/transceiver 32 includes the receiver and the transmitter. The transmitter is configured to simultaneously send a plurality of PPDUs to a receiving station on a plurality of channels, where each of the plurality of channels has one PPDU of the plurality of PPDUs, the plurality of PPDUs include a plurality of MPDU sets, each of the plurality of PPDUs includes one MPDU set of the plurality of MPDU sets, and each of the plurality of MPDU sets includes at least a copy of a start MPDU.

The receiver is configured to receive a block acknowledgment on one or more channels of the plurality of channels from the receiving station, where the block acknowledgment includes acknowledgment information, and the acknowledgment information indicates acknowledgment of MPDUs successfully received on the plurality of channels and transmission quality of each of the plurality of MPDU sets.

Further, the device 3000 may further include a processor 33 (represented by a dashed line in the figure). The processor 33 is configured to adjust a transmission parameter based on the transmission quality of each of the plurality of MPDU sets.

There may be one or more processors 33. The processor 33 includes a central processing unit, a network processor, a graphics processing unit (GPU), an application-specific integrated circuit, a programmable logic device, or any combination thereof. The PLD may be a complex programmable logic device, a field programmable gate array, generic array logic, or any combination thereof.

Further, the device 3000 may further include a memory 34. The memory 34 is configured to store a method procedure executed by the processor 33.

The memory may include a volatile memory, for example, a random-access memory (RAM). The memory may also include a non-volatile memory, for example, a flash memory, a hard disk drive (HDD), or a solid-state drive (SSD). The memory may further include a combination of the foregoing types of memories.

According to the wireless local area network transmission device provided in this embodiment of this disclosure, a transmission result of each channel can be obtained while an overall result of transmission on the plurality of channels is obtained, so that system transmission performance can be improved.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in this disclosure, it should be understood that the disclosed system, apparatus, and method may be implemented in other manners. For example, the unit division is merely logical function division and may be other division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on an actual requirement to achieve an objective of the solutions of embodiments.

All or some of the foregoing embodiments may be implemented by using software, hardware, firmware, or any combination thereof. When software or firmware is used to implement the embodiments, all or some of the embodiments may be implemented in a form of a computer program product. The computer program product includes one or more computer instructions. When the computer instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a RAM, or a magnetic medium, for example, a floppy disk, a hard disk drive, a magnetic tape, a magnetic disk, or an optical medium, for example, an optical disc, or a semiconductor medium, for example, an SSD.

What is claimed is:

1. A wireless local area network (WLAN) transmission method implemented by a receiving station, wherein the WLAN transmission method comprises:
   simultaneously receiving, on a plurality of channels of the receiving station, a plurality of physical layer convergence procedure protocol data units (PPDUs) from a sending station, wherein each of the plurality of channels has one PPDU of the plurality of PPDUs, wherein the plurality of PPDUs comprises a plurality of media access control protocol data unit (MPDU) sets, wherein each of the plurality of PPDUs comprises one MPDU set of the plurality of MPDU sets, and wherein each of the plurality of MPDU sets comprises a copy of a start MPDU; and
   sending, on one of the plurality of channels of the receiving station, a block acknowledgment comprising acknowledgment information, wherein the acknowledgment information indicates acknowledgment of first MPDUs successfully received on the plurality of channels of the receiving station and transmission quality of each of the plurality of MPDU sets received on the plurality of channels of the receiving station.

2. The WLAN transmission method of claim 1, wherein the acknowledgment information comprises an acknowledgment bitmap of the first MPDUs and a first quantity of successfully transmitted second MPDUs in each of the plurality of MPDU sets.

3. The WLAN transmission method of claim 1, wherein the acknowledgment information comprises an acknowledgment bitmap of the successfully received MPDU and a ratio of a first quantity of successfully transmitted MPDUs in each of the plurality of MPDU sets to a total quantity of MPDUs in a corresponding MPDU set.

4. The WLAN transmission method of claim 1, wherein the acknowledgment information comprises a plurality of acknowledgment bitmaps, and wherein each of the plurality of acknowledgment bitmaps is of a successfully received MPDU in each of the plurality of MPDU sets.

5. A wireless local area network (WLAN) transmission method implemented by a sending station, wherein the WLAN transmission method comprises:
   simultaneously sending, to a plurality of channels of a receiving station, a plurality of physical layer convergence procedure protocol data units (PPDUs), wherein each of the plurality of channels has one PPDU of the plurality of PPDUs, wherein the plurality of PPDUs comprises a plurality of media access control protocol data unit (MPDU) sets, wherein each of the plurality of PPDUs comprises one MPDU set of the plurality of MPDU sets, and wherein each of the plurality of MPDU sets comprises a copy of a start MPDU; and
   receiving, from one of the plurality of channels of the receiving station, a block acknowledgment comprising acknowledgment information, wherein the acknowledgment information indicates acknowledgment of first MPDUs successfully received on the plurality of channels of the receiving station and transmission quality of each of the plurality of MPDU sets received on the plurality of channels of the receiving station.

6. The WLAN transmission method of claim 5, further comprising adjusting, based on the transmission quality of each of the plurality of MPDU sets, a transmission parameter.

7. The WLAN transmission method of claim 5, wherein the acknowledgment information comprises an acknowledgment bitmap of the first MPDUs and a first quantity of successfully transmitted second MPDUs in each of the plurality of MPDU sets.

8. The WLAN transmission method of claim 7, wherein the acknowledgment information further comprises a ratio of the first quantity to a total quantity of MPDUs in a corresponding MPDU set.

9. The WLAN transmission method of claim 5, wherein the acknowledgment information comprises a plurality of acknowledgment bitmaps, and wherein each of the plurality of acknowledgment bitmaps is of a successfully received MPDU in each of the plurality of MPDU sets.

10. A wireless local area network (WLAN) device, comprising:
   a receiver configured to simultaneously receive, on a plurality of channels of the WLAN device, a plurality of physical layer convergence procedure protocol data units (PPDUs) from a sending station, wherein each of the plurality of channels has one PPDU of the plurality of PPDUs, wherein the plurality of PPDUs comprises a plurality of media access control protocol data unit (MPDU) sets, wherein each of the plurality of PPDUs comprises one MPDU set of the plurality of MPDU sets, and wherein each of the plurality of MPDU sets comprises a copy of a start MPDU; and
   a transmitter configured to send, on one of the plurality of channels of the WLAN device, a block acknowledgment comprising acknowledgment information, wherein the acknowledgment information indicates acknowledgment of first MPDUs successfully received on the plurality of channels of the WLAN device and transmission quality of each of the plurality of MPDU sets received on the plurality of channels of the WLAN device.

11. The WLAN device of claim 10, wherein the acknowledgment information comprises an acknowledgment bitmap of the first MPDUs and a first quantity of successfully transmitted second MPDUs in each of the plurality of MPDU sets.

12. The WLAN device of claim 11, wherein the acknowledgment information further comprises a ratio of the first quantity to a total quantity of MPDUs in a corresponding MPDU set.

13. The WLAN device of claim 10, wherein the acknowledgment information comprises a plurality of acknowledgment bitmaps, and wherein each of the plurality of acknowledgment bitmaps is of a successfully received MPDU in each of the plurality of MPDU sets.

14. A wireless local area network (WLAN) device, comprising:
   a transmitter configured to simultaneously send, to a plurality of channels of a receiving station, a plurality of physical layer convergence procedure protocol data units (PPDUs), wherein each of the plurality of channels has one PPDU of the plurality of PPDUs, wherein the plurality of PPDUs comprises a plurality of media access control protocol data unit (MPDU) sets, wherein each of the plurality of PPDUs comprises one MPDU set of the plurality of MPDU sets, and wherein each of the plurality of MPDU sets comprises a copy of a start MPDU; and
   a receiver configured to receive, from one of the plurality of channels of the receiving station, receive a block acknowledgment comprising acknowledgment information, wherein the acknowledgment information indicates acknowledgment of first MPDUs successfully received on the plurality of channels of the receiving station and transmission quality of each of the plurality of MPDU sets received on the plurality of channels of the receiving station.

15. The WLAN device of claim 14, wherein the acknowledgment information comprises an acknowledgment bitmap of the first MPDUs and a first quantity of successfully transmitted second MPDUs in each of the plurality of MPDU sets.

16. The WLAN device of claim 15, wherein the acknowledgment information further comprises a ratio of the first quantity to a total quantity of MPDUs in a corresponding MPDU set.

17. The WLAN device of claim 14, wherein the acknowledgment information comprises a plurality of acknowledgment bitmaps, and wherein each of the plurality of acknowledgment bitmaps is of a successfully received MPDU in each of the plurality of MPDU sets.

18. The WLAN device of claim 14, further comprising a processor configured to adjust, based on transmission quality of each of a plurality of MPDU sets, a transmission parameter.

19. The WLAN device of claim 18, wherein the transmission parameter comprises a channel rate.

20. The WLAN device of claim 14, further comprising a modem, wherein the transmitter and the receiver share the modem.

* * * * *

UNITED STATES PATENT AND TRADEMARK OFFICE
CERTIFICATE OF CORRECTION

PATENT NO. : 12,355,568 B2  
APPLICATION NO. : 17/844313  
DATED : July 8, 2025  
INVENTOR(S) : Ran Sang, Yungui Wang and Chenhe Ji Page 1 of 1

It is certified that error appears in the above-identified patent and that said Letters Patent is hereby corrected as shown below:

In the Claims

Claim 14, Column 14, Line 34: "station, receiving a block" should read "station, a block"

Signed and Sealed this  
Fifth Day of August, 2025

Coke Morgan Stewart  
*Acting Director of the United States Patent and Trademark Office*